US011682031B2

(12) United States Patent
Maheshwari et al.

(10) Patent No.: US 11,682,031 B2
(45) Date of Patent: Jun. 20, 2023

(54) ARTIFICIAL INTELLIGENCE TOOL TO PREDICT USER BEHAVIOR IN AN INTERACTIVE ENVIRONMENT

(71) Applicant: ADOBE INC., San Jose, CA (US)

(72) Inventors: Paridhi Maheshwari, Madhya Pradesh (IN); Tanay Anand, Bangalore (IN); Atanu Sinha, Bangalore (IN)

(73) Assignee: ADOBE INC., San Jose, CA (US)

( * ) Notice: Subject to any disclaimer, the term of this patent is extended or adjusted under 35 U.S.C. 154(b) by 0 days.

(21) Appl. No.: 17/376,405

(22) Filed: Jul. 15, 2021

(65) Prior Publication Data

US 2023/0015978 A1 Jan. 19, 2023

(51) Int. Cl.
*G06Q 30/0202* (2023.01)
*G06Q 30/0226* (2023.01)
*G06Q 30/0201* (2023.01)
*G06F 18/2415* (2023.01)

(52) U.S. Cl.
CPC ..... *G06Q 30/0202* (2013.01); *G06F 18/2415* (2023.01); *G06Q 30/0201* (2013.01); *G06Q 30/0226* (2013.01)

(58) Field of Classification Search
CPC ........... G06Q 30/0202; G06Q 30/0201; G06Q 30/0226; G06K 9/6277
USPC ....................................................... 705/7.31
See application file for complete search history.

(56) References Cited

U.S. PATENT DOCUMENTS

2021/0192549 A1* 6/2021 Sinha ................. G06Q 30/0204

OTHER PUBLICATIONS

Deniz Parmaksiz, Predicting Likelihood to Purchase of Users for E-commerce, 2020 (Year: 2020).*
Bhagat, Rahul, et al. "Buy it again: Modeling repeat purchase recommendations." Proceedings of the 24th ACM SIGKDD International Conference on Knowledge Discovery & Data Mining. 2018.
Allenby, Greg M., Robert P. Leone, and Lichung Jen. "A dynamic model of purchase timing with application to direct marketing." Journal of the American Statistical Association (1999).
Jinfeng Yi, Cho-Jui Hsieh, Kush R Varshney, Lijun Zhang, and Yao Li. "Scalable demand-aware recommendation." In Advances in Neural Information Processing Systems. (2017).

(Continued)

*Primary Examiner* — Tarek Elchanti
(74) *Attorney, Agent, or Firm* — F. Chau & Associates, LLC (57) ABSTRACT

A method for predicting user purchase by a user of a first site includes: selecting a distribution representing a probability distribution (PD) of inter-purchase-times (IPTs) across the first site and a second other site for each user, assigning each purchase of each user to one of the first site and the second site according to a Stochastic model, combining the selected PD with the Stochastic model to generate a PD of IPTs for only the first online site, estimating parameters of the probability distribution of IPTs for the first site by applying a Statistical modeling approach to features of each user, applying a sequence of observed IPTs of a given user for the first site and the parameters of the given user to the selected distribution to generate a probability, and determining whether the next purchase occurs on the second site based on the probability.

19 Claims, 8 Drawing Sheets

(56) References Cited

OTHER PUBLICATIONS

Serge Egelman, Janice Tsai, Lorrie Cranor, and Alessandro Acquisti. "Timing is everything? The effects of timing and placement of online privacy indicators." In Proceedings of the SIGCHI Conference on Human Factors in Computing Systems. (2009).

Ruey-Shan Guo, "A multi-category inter-purchase time model based on hierarchical Bayesian theory", Expert Systems with Applications 36 (2009) 6301-6308.

Yuxin Chen, Joel H. Steckel, "Modeling Credit Card Share of Wallet: Solving the Incomplete Information Problem", Journal of Marketing Research, vol. XLIX (Oct. 2012), 655-669.

* cited by examiner

| Customer Id | Loyalty status (categorical) | # Offers received (numerical) | # Purchased (numerical) |
|---|---|---|---|
| 1 | 1 | 4 | 6 |
| 2 | 3 | 7 | 9 |
| 3 | 2 | 5 | 12 |

Feature Data (330)

ARTIFICIAL INTELLIGENCE TOOL TO PREDICT USER BEHAVIOR IN AN INTERACTIVE ENVIRONMENT

TECHNICAL FIELD

This disclosure relates generally to using Artificial Intelligence (AI) to predict whether and when a user of an online site will interact with another online site, in an interactive environment, even though no data about the other online site is available.

BACKGROUND

Digital analytics tools may be used to manage interactions between an online firm and their users, to facilitate customer journey management and to increase user engagement with the firm. Conventional tools in this regard make use of data available to the firm to determine various metrics of user interactions with the firm. However, these tools are not able to predict user interactions with competitors of the firm.

Users of the online firm also engage online with competitors of the firm. The likelihood of losing its user's engagement to one or more of these competitors exists. Conventional analytics tools are not able to predict when the firm is likely to lose a user engagement to a competitor because the firm does not have access to data on user interactions with the competitors. Thus, conventional analytics tools cannot alert the firm about the timing of interactions of users with a competitor.

Additionally, conventional analytics tools cannot determine the timing of interactions of individual users with a competitor. Even if one were to use timing information aggregated across all users, this information is incomplete and not useful since users will not be interacting with the competitors all together, but interact at timings that suit each user.

Thus, conventional tools are ineffective and inefficient when it comes to determining a user's interaction behavior with competitors. Since competitor data are not available to the firm, the conventional tools cannot provide any metric for determining any aspect of user behavior at the competitors.

SUMMARY

Systems, methods, and software are described herein for predicting a next interaction (e.g., purchase) of users of a first online site at a second other online site or the first online site using behavior log data including interactions of the users with only the first online site. Results of the prediction may be used to disengage a user from the second online site or to increase engagement of the user with the first online site. The prediction is made using a model, which is a combination of a probability distribution of inter-purchase-times (IPTs) across the first online site and the second online site for each user and a Stochastic model representative of interactions between each user and the first online site and the second online site. Since the probability distribution may be generated by selecting a Gamma Distribution and an aspect of the Stochastic model associated with the second online site may be generated by treating some purchases of each user on the first online site as a purchase on the second online site, the model can be used to predict a next interaction of a user with the second online site without relying on actual interactions by the users with the second online site.

In an exemplary embodiment of the disclosure, a method for predicting user purchase includes: gathering engagement data from interactions of users with a first online site including purchases by users at the first online site, generating inter-purchase-times (IPTs) for each of the users from the purchases, generating a Stochastic model representing probabilities of purchase by the users at the first online site and a second other online site without using interactions of the users with the second online site by assigning each of the IPTs to one of the first online site and the second other online site, selecting a distribution that represents a probability distribution of IPTs across the first online site and the second online site, combining the selected distribution with the Stochastic model to generate a probability distribution of IPTs for only the first online site, estimating parameters of the probability distribution of IPTs for the first online site by applying a Statistical modeling approach to features of each user, generating a probability of a next purchase by applying a sequence of observed IPTs of a given one of the users associated with the first online site and the parameters of the given user to the selected distribution, and determining whether the next purchase occurs on the second online site based on the probability of the next purchase.

In an exemplary embodiment of the disclosure, a system for predicting user purchase includes a client device and a server. The client device includes a user interface and a computer program configured to output a query across a computer network based on an interaction of a user with the user interface. The server is configured to receive the query from the computer network, generate a model for estimating purchase of each of a plurality of users of a first online site on a second other online site in response to the query, generate user information indicating which of the users are predicted to make a purchase on the second online site from the model and features of each of the users, and output the user information across the computer network. The user interface presents a list of the users predicted to make a next purchase on the second online site using the user information. The model is generated by combining a probability distribution of inter-purchase-times (IPTs) across the first online site and the second online site with a Stochastic model generated from assigning each purchase of each user of a given time period to one of the first online site and the second online site.

In an exemplary embodiment of the disclosure, a method for predicting user purchase includes: selecting an Erlang distribution to model a first probability distribution (PD) of inter-purchase-times (IPTs) for each of a plurality of users across a first online site and a second other online site, computing a time period from an IPT of the Erlang distribution, generating a second PD of IPTs for only the first online site from the Erlang distribution and a Stochastic model representing probabilities that the users having made a prior purchase on the first online site make a next purchase on the first online site and probabilities that the users having made a prior purchase on the second online site makes a next purchase on the first online site, estimating parameters of the second PD using a sequence of purchases on the second site by the given user and features of the given user, and determining whether the given user is to make a next purchase on the second online site from the estimated parameters, the second PD, and an observed sequence of IPTs of the given user, when a current time is within the time period.

BRIEF DESCRIPTION OF THE DRAWINGS

The detailed description describes one or more embodiments with additionally specificity and detail through use of the accompanying drawings, briefly described below.

FIG. 3B illustrates exemplary features for each of the users.

DETAILED DESCRIPTION OF EXEMPLARY EMBODIMENTS

An existing approach for estimating a next purchase ("inter-purchase time") of a user of an online site on either the online site or other online sites makes use of user panel data, which includes a user's visits to the online site and the other online sites. For example, a user's future purchases can be predicted using a Poisson-Gamma distribution or a hierarchical Bayesian model based on a generalized Gamma distribution.

However, predicting inter-purchase time of a user of a first site on a second other site using a Poisson-Gamma distribution or a hierarchical Bayesian model based on a generalized Gamma distribution is ineffectual unless sufficient engagement data of the second site (e.g., website) is available. Further, with no engagement data about the second site, there is no ground truth to validate any prediction.

Embodiments of the disclosure provide a model generated using only the engagement data of the first site that can predict timing of user purchase with the second site. The predicted timing may be used as a new metric in a user journey map (CJM). The model may predict a probability of a user of the first site purchasing from either the first site or the second site. Further, the model's predictive performance may be verified even though no engagement data of the second site is available.

An embodiment of the disclosure generates a model to predict purchase of a user at the first site or other second sites (e.g., site in competition with the first site) that accounts for impact of competitor sites and predicts timing of the purchase using only the engagement data of the first site.

At least one embodiment of the disclosure generates a model for estimating purchase of users of a first online site on a second other online site by selecting a probability distribution of inter-purchase-times (IPTs) across the first online site and the second online site for each user from sequences of observed inter-purchase-times (IPTs) determined from engagement data of the first online site, assigning each purchase of each user of a given time period to one of the first online site and the second online site according to a Stochastic model, combining the selected probability distribution of IPTs across the first online site and the second online site with the Stochastic model to generate a probability distribution of IPTs for only the first online site, estimating parameters of the probability distribution of IPTs for the first online site by applying a Statistical modeling approach to features of each user, applying a sequence of observed IPTs of a given one of the users and the parameters of the given user to the selected probability distribution to generate a probability of a next purchase, and determining whether the next purchase occurs on the second online site based on the probability of the next purchase. A time of the next purchase may be computed using IPTs of the selected probability distribution. Once it is determined that the next purchase will occur at the second online site within a current period, information (e.g., an e-mail, text, social media message, etc.) can be sent to the user to discourage engagement with the second online site.

The following terms are used throughout the present disclosure:

The term "Gamma distribution" refers to a two-parameter family of continuous distributions having a shape parameter s and a scale parameter $\beta$.

The term "Erlang distribution" refers to a special case of the Gamma distribution where the shape parameter s is a positive integer.

The term "Stochastic model" refers to a tool for estimating distributions of potential outcomes by allowing for random variation in one or more inputs of time.

The term "Markov model" refers to a Stochastic model used to model pseudo-randomly changing systems, where it is assumed that future states depend only on the current state.

The term "Statistical model" refers to a mathematical model that embodies statistical assumptions concerning the generation of sample data (e.g., similar data from a larger population). The Statistical model may be specified as the mathematical relationship between one or more random variables and other non-random variables.

The term "Bayesian Hierarchical model" refers to a Statistical model in a hierarchical form (e.g., multiple levels) that estimates parameters of a posterior distribution using a Bayesian Inference.

The term "Bayesian Inference" refers to a method of statistical inference in which Bayes' theorem is used to update the probability for a hypothesis as more evidence or information becomes available.

Figure 1:
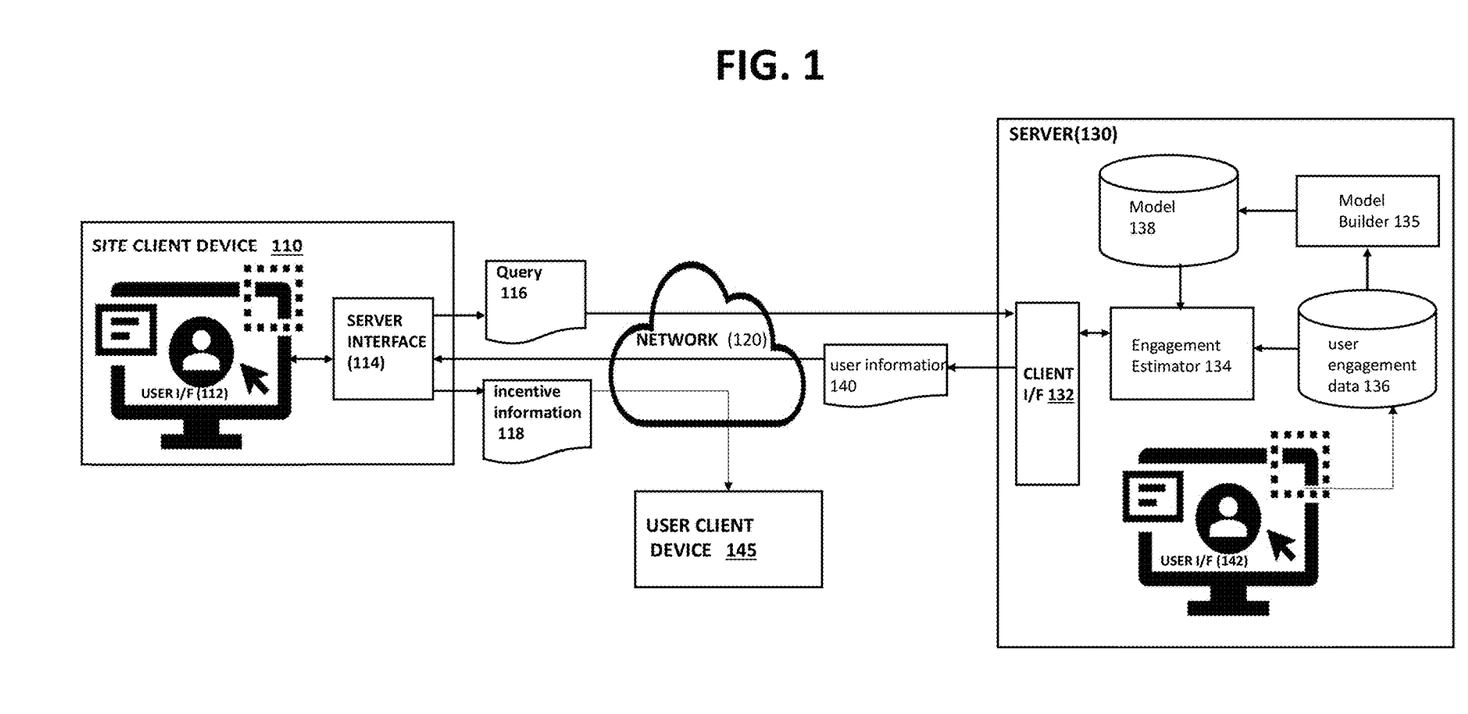
FIG. 1 is an illustration of an environment in an example implementation that is operable to employ techniques described herein.

Exemplary embodiments of the inventive concept are applicable to a client-server environment and a client-only environment. FIG. 1 shows an example of the client-server environment, where a user uses a graphical user interface 112 of a site client device 110 of a first online site to query for user information 140 on existing users of the first online site. The user information 140 may indicate which of the users are likely to make a purchase, the timing of the purchases, and whether the purchase is likely to be on the first online site or on one or more second other online sites.

A server interface 114 of the site client device 110 outputs a query 116 to the server 130 across a computer network 120 to request the user information 140. The server 130 provides the user information 140 to the site client device 110 of the first site in response to the query 116.

The server interface 114 generates presented information based the user information 140 for presentation on the graphical user interface 112. The presented information may list which users have been predicted to make a purchase, the timing of the purchases, and whether the purchase will occur on the first site or the second site(s).

A model builder 135 of the server 130 operates on user engagement data 136 of users of the first site to generate a model 138. In an embodiment, the user engagement data 136 indicates for each of a plurality of users of the first site, a unique identifier (ID) and purchase dates of purchases by the corresponding user on the first site. While the below discussion will focus on purchase dates, such dates may be replaced with or further include purchase consideration dates. A purchase consideration date means that on the date in question, the user considered making a purchase. For example, a user may be deemed to have considered making a purchase if they viewed a web page of a product for more than a certain amount of time or placed the product in a virtual shopping cart. The generation of the model 138 will be discussed in more detail below.

A client interface 132 of the server 130 receives the query 116 across the network 120, and for each user, an engagement estimator 134 of the server 134 applies feature data (e.g., one or more features) of the corresponding user to the model 138 to generate a probability of a next purchase Pnp and potentially a probability of the next purchase occurring at a second site Pcp in response to receiving the query 116, the engagement estimator 134 estimates a time of the next purchase, and the engagement estimator 134 generates the user information 140 from the probabilities and estimated time. The feature data may be stored in the user engagement data 136 or at another location. The feature data and application of the feature data to the model 138 to generate the probabilities will be discussed in more detail below. The engagement estimator 134 combined with the model builder 135 may be referred to as an AI tool since the model builder 135 automatically generates the model 138 and the engagement estimator 134 automatically generates the probability of a next purchase on the second site by a user of the first site and the timing of the next purchase using the model 138. For example, the model builder 135 may automatically generate the model 138 using the engagement data 136 of multiple users and the engagement estimator 134 may automatically generate the probability of a next purchase by a given user on the second site and the timing of the next purchase using the model 138 and the feature data of the given user.

The user engagement data 136 may be entered using a user interface 142 of the server 130 or loaded from one or more electronic files. In an embodiment, the user engagement data 136 is not present on the server 130, but is accessible by the server 130 from another computer across the network 120.

In an embodiment, the server interface 114 of the site client device 110 of the first site analyzes the user information 140 to determine whether to output incentive information 118 to a user client device 145 of one of the existing users. For example, if the user information 140 indicates that a given user is likely to make a next purchase on the second site, the incentive information 118 for the user client device 145 of the given user may include an electronic coupon for the first site at a first discount level (e.g., 50% off). For example, if the user information 140 indicates the given user is likely to make a next purchase on the first site, this event could be ignored or the incentive information 118 could include an electronic coupon for the first site at a second lower discount level (e.g., 10% off). In an exemplary embodiment, the server 130 generates the incentive information 118 and outputs the same to the user client device 145 without involving the site client device 110.

According to an embodiment of the inventive concept in a client-only environment, the engagement estimator 134 and the model builder 135 are present on the client device 110 of the focal firm, and the client device 110 creates the user information 140 locally without reliance on the server 130.

The computer network 120 may be wired, wireless, or both. The computer network 120 may include multiple networks, or a network of networks, but is shown in a simple form so as not to obscure aspects of the present disclosure. By way of example, the computer network 120 includes one or more wide area networks (WANs), one or more local area networks (LANs), one or more public networks, such as the Internet, and/or one or more private networks. Where the computer network 120 includes a wireless telecommunications network, components such as a base station, a communications tower, or even access points (as well as other components) may provide wireless connectivity. Networking environments are commonplace in offices, enterprise-wide computer networks, intranets, and the Internet. Accordingly, the computer network 120 is not described in significant detail.

The client device 110 is a computing device capable of accessing the Internet, such as the World Wide Web. The client device 110 might take on a variety of forms, such as a personal computer (PC), a laptop computer, a mobile phone, a tablet computer, a wearable computer, a personal digital assistant (PDA), an MP3 player, a global positioning system (GPS) device, a video player, a digital video recorder (DVR), a cable box, a set-top box, a handheld communications device, a smart phone, a smart watch, a workstation, any combination of these delineated devices, or any other suitable device.

The client devices 110 or 145 includes one or more processors, and one or more computer-readable media. The computer-readable media may include computer-readable instructions executable by the one or more processors. The instructions may correspond to one or more applications, such as software to manage the graphical user interface 112, software to output the query 116, software to receive the user information 140, and software to output or receive the incentive information 118.

The server 130 includes a plurality of computing devices configured in a networked environment or includes a single computing device. Each server 130 computing device includes one or more processors, and one or more computer-readable media. The computer-readable media may include computer-readable instructions executable by the one or more processors. The instructions may correspond to one or more applications, such as software to interface with the client device 110 for receiving the query 116 and outputting the user information 140.

Figure 2:
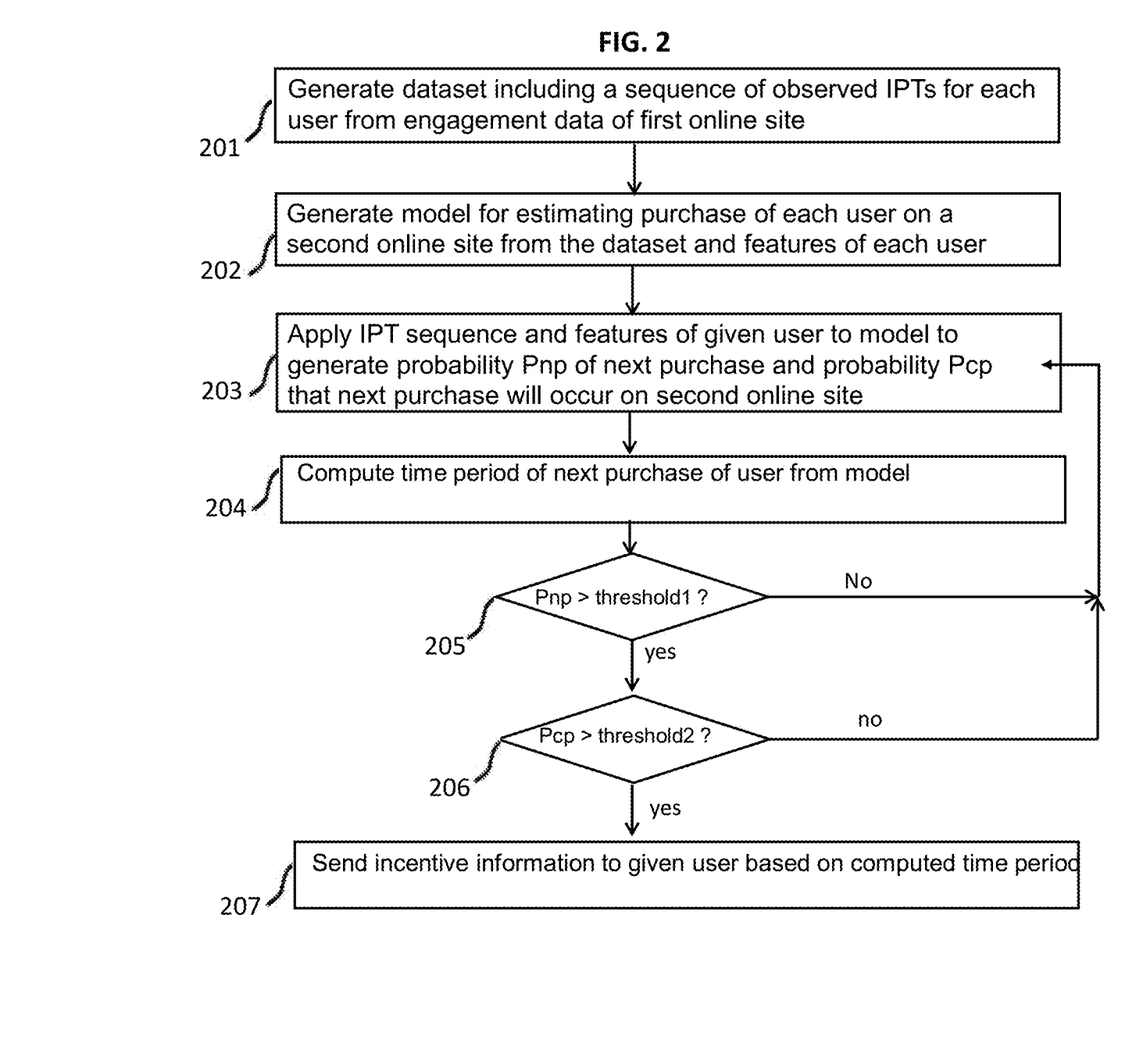
FIG. 2 illustrates a method disengaging a user of a site another site according to an exemplary embodiment of the disclosure.

FIG. 2 illustrates a method for disengaging a user of a first site with a second site according to an exemplary embodiment of the disclosure.

The method of FIG. 2 includes generating a dataset including a sequence (e.g., a time sequence) of observed inter-purchase-times (IPTs) for each user from engagement data 136 of a first online site (step 201). The engagement data 136 does not include data of other sites (e.g., interactions between a user of the first site and the other sites).

Figure 3A:
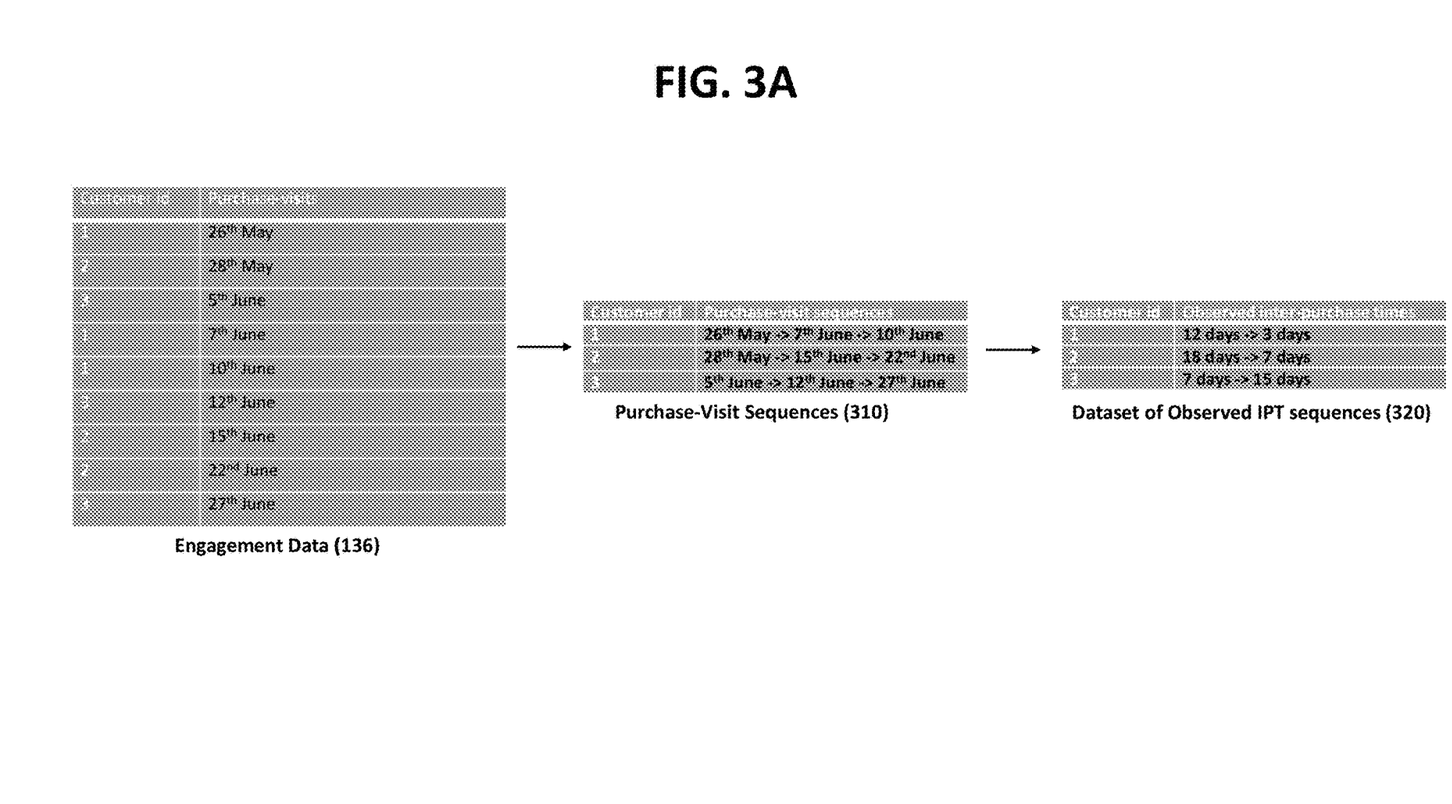
FIG. 3A illustrates an example of converting engagement data into a form usable by the method of FIG. 2.

FIG. 3A illustrates an example of generating the dataset 320 from exemplary engagement data 136 that includes purchase-visit dates for users of the focal firm. For example, as shown in FIG. 3A, the engagement data 136 includes an entry for each purchase that identifies the user and the date of the purchase. In an alternate embodiment, the date of a purchase could be replaced with a date the user considered making a purchase (e.g., placed product in virtual shopping cart or viewed webpage of product for more than a certain amount of time). In FIG. 3A, all the purchase-visits of each user are combined to form purchase-visit sequences 310. For example, since a user with ID=1 made purchases on May 26th, June 7th, and June 10th in the engagement data 136, this can be replaced with a single purchase-visit sequence of May 26th>June 7th→June 10th in the purchase-visit sequences 310. The purchase-visit sequence 310 can then be used to create an IPT sequence in the Dataset 320. The IPT sequence is created by calculating a difference between adjacent purchase-visits. Since the difference between the June 7th and May 26th purchases of the user is 12 days, and the difference between the June 10th and June 7th purchases of the user is 3 days, these differences result in a first IPT of 12 days and a second IPT of 3 days (e.g., see IPT sequence 12 days→3 days in the Dataset 320).

The method of FIG. 2 further includes generating a model 138 for estimating purchase of each user on a second online site from the Dataset 320 and feature data of each user (step 202). The generation of the model 138 may include: 1) selecting a distribution that represents a probability distribution of IPTs across the first online site and the second online site for each user, 2) generating a Stochastic model by assigning each purchase of each user in a behavior log data to one of the first online site and the second online site, and 3) combining the selected distribution with the Stochastic model to generate a probability distribution of IPTs for only the first online site.

FIG. 3B illustrates an example of the feature data 330 of each user. In this example, the feature data 330 indicates that each user has three features, namely a loyalty status, a number of offers received, and a number of purchases. For example, a user that has consistently made purchases over the last ten years would have a higher loyalty status than a user that has sporadically made purchases over the last three years. For example, a number of offers may indicate how many coupons a given user received from the focal firm during a certain time period. For example, a number of purchases may indicate how many purchases were made by the given user at the focal firm during a certain period. While FIG. 3B illustrates the presence of three features per user and specific features, embodiments of the disclosure are not limited thereto. For example, there may be less than three features or more than features in an alternate embodiment, and one or more of the illustrated features may be replaced with a different feature. For example, the other features may include a visit number (number of visits to site of focal firm over a period of time), city (e.g., city in which user lives), country (e.g., country in which user lives), hit time, product finding method, internal campaign, number of items in cart, tier (e.g., level of service provided to user), payment type (e.g., credit card, cryptocurrency, debit card, etc.).

The method of FIG. 2 further includes applying an IPT sequence and features of a given user to the model to generate a probability Pnp of a next purchase by the given user and a probability Pcp that the next purchase will occur on the second online site (step 203). The generation of probabilities Pnp and Pcp will be discussed in more detail below.

The method of FIG. 2 further includes computing a time period of a next purchase based on the model (step 204). In an embodiment, the computed time period is determined by calculating a start time, a duration, and the computed time period ranges from the start time to the start time plus the duration. In an embodiment, the start time is a time of a recent purchase of a given user or a future time during which the first site desires to begin sending out incentives if there has been no recent purchase. For example, a purchase could be considered recent if it is within a pre-defined period of the present time. In an embodiment, the duration is calculated from computing an average IPT using the model. In an embodiment, the model is a probability distribution of the IPTs for each user across the first site and one or more second sites, and the duration is calculated from computing an average IPT across the probability distribution. In another embodiment, the duration is calculated from the average IPT minus a standard deviation of the probability distribution. In another embodiment, the duration is calculated from randomly selecting an IPT from the probability distribution.

The method of FIG. 2 further includes determining whether the probability Pnp of a next purchase exceeds a certain first threshold (step 205). If the probability Pnp of a next purchase does not exceed a certain first threshold, the method of FIG. 2 can resume to step 203 to operate on a next user.

If the probability Pnp of a next purchase exceeds the certain first threshold, the method of FIG. 2 includes determining whether the probability Pcp that the next purchase will be occur on the second online sites exceeds a certain second threshold (step 206).

If the probability Pcp that the next purchase will occur on the second online site exceeds the second threshold, the method of FIG. 2 includes sending incentive information 118 to the given user at a time based on the computed time period (step 207). For example, if the present time is within the computed time period, the incentive information 118 is sent out. If the present time is not within the computed time period, the sending of the incentive information 118 is delayed until the present time is within the computed time period.

The incentive information 118 may be designed to disengage the given user from engaging with the second online site. For example, if the second online site sells products in a certain industry, the incentive information 118 could include coupons for products in the certain industry with the first online site. In another embodiment, the incentive information 118 includes information about a latest new product provided by the first online site.

If the probability Pcp that the next purchase will occur on the second site does not exceed the second threshold, the method of FIG. 2 may resume to step 203 to operate on a next user without sending the incentive information. In an alternate embodiment when the incentive information 118 includes a coupon, the incentive information 118 is sent to the given user even when the next purchase is estimated to occur on the first online site, but at a discount level lower than when the given user is estimated to make a next purchase on the second online site.

Figure 4A:
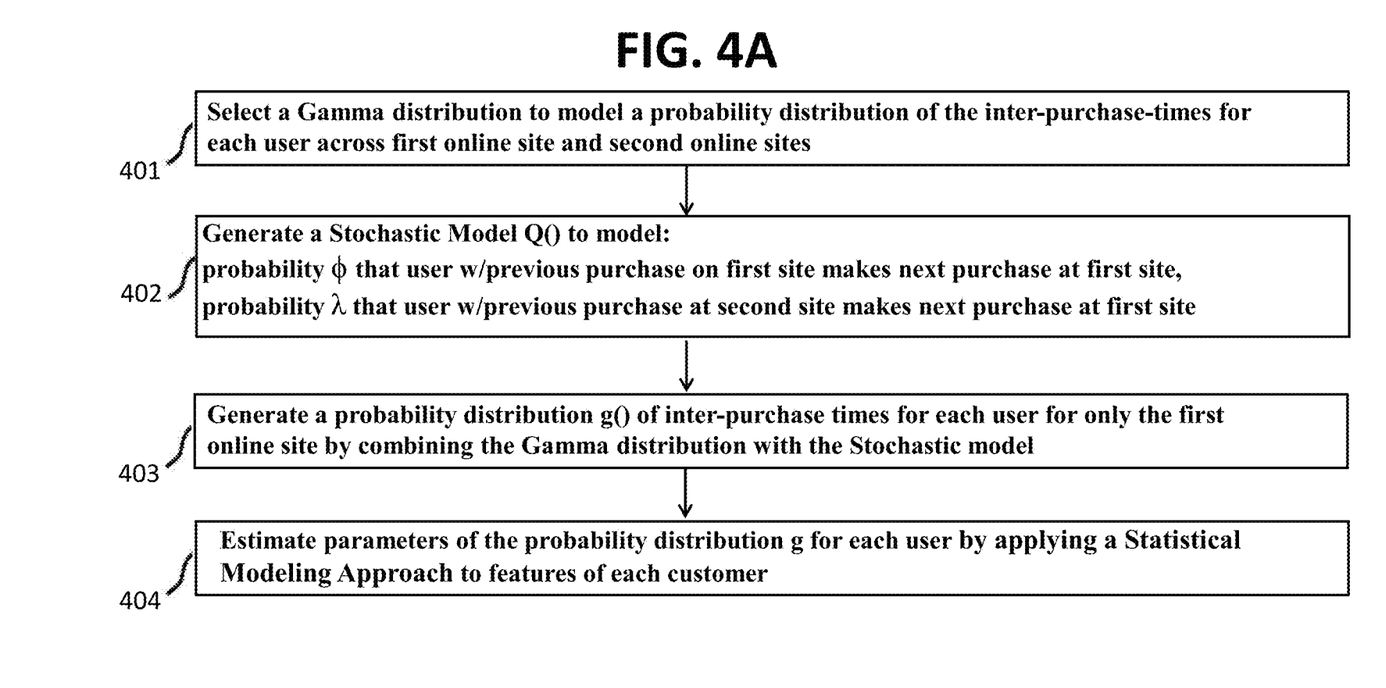
FIG. 4A illustrates a method generating a model for estimating purchase by a user of a site on another site according to an exemplary embodiment of the disclosure.

FIG. 4A illustrates a method of implementing step 202 of FIG. 2 for generating the model, according to an embodiment of the disclosure.

1. Select a Distribution that Represents IPTs Across First and Second Sites

The method of FIG. 4A includes selecting a Gamma distribution (e.g., Erlang-1 or Erlang-2) to model a probability distribution f( ) of the IPT for each user across the first online site and one or more second other online sites (step 401). The below Equation 1 is an example of the Erlang distribution that is based on an IPT t, a scale parameter s, and shape parameter $\beta_i$ for each user i. Selecting the Gamma distribution may include choosing values for a scale parameter s and a shape parameter $\beta_i$.

$$f_i(t;\ s,\ \beta_i) = \frac{\beta_j^s t^{s-1} e^{-\beta_i t}}{(s-1)!} \quad \text{[Equation 1]}$$

2. Generate Stochastic Model

The method of FIG. 4A further includes generating a Stochastic model Q( ) to model a probability $\phi$ that a user with a previous purchase on the first online site makes a next purchase on the first site and a probability $\lambda$ that a user with a previous purchase on the second site makes a next purchase on the first site (step 402). The Stochastic model Q( ) may be generated by assigning some of the purchases of the users on the first site in the engagement data 136 to purchases on the second site. Thus, some of the purchases of the users on the first site are suppressed and converted into corresponding purchases of the users on the second site.

Figure 4B:
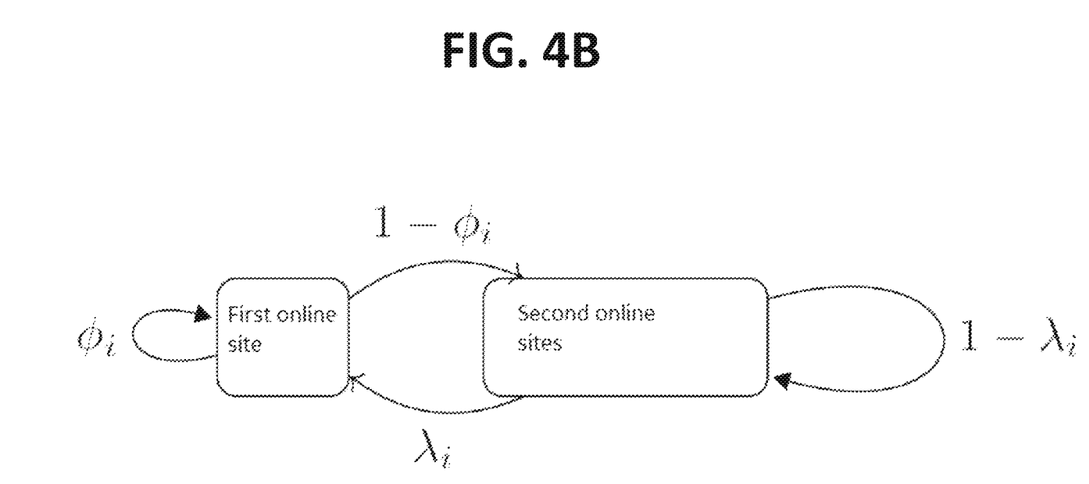
FIG. 4B illustrates an example of a Markov model that may be used in the method of FIG. 4A.

In an exemplary embodiment, the Stochastic model is a Markov model. FIG. 4B shows an example of the Markov model. On occasion $\tau$, a user purchases either with the firm or its competitors. On successive occasions, a user can move among these states. For example, on occasion $\tau$, the user can be in either state in the step [first site, second sites] and on the next occasion, the user can move to either state in [first site, second sites]. Purchase at occasion $\tau$ is influenced by whether a purchase at $\tau-1$ occurred on the first site as opposed to a second site, which is inline with use of a Markov chain. Parameter $\phi_i$ (e.g., a first Markovian probability of the Markov model) is assumed to be the probability that an i-th user (e.g., a given user among the existing users of the first site) who purchases from the first site at $\tau-1$ returns at $\tau$ to the first site to make a next purchase. Parameter $\lambda_i$ (e.g., a second Markovian probability of the Markov model) is assumed to be the probability that the i-th user who purchases from a second site at $\tau-1$ purchases from the first site at $\tau$. The resulting 2-state Markov diagram is shown in FIG. 4B.

3. Combine Selected Distribution with Stochastic Model

The method of FIG. 4A further includes generating a probability distribution $g_i$( ) of inter-purchase-times for each user (e.g., an IPT distribution of an i-th user) for only the first online site by combining the Gamma distribution with the Stochastic model (step 403). For example, when the Stochastic model is a Markov model, the i-th user's IPT distribution $f_i$( ) for all sites (e.g., first site and second sites) is combined with the Markov model Q( ) to derive the IPT distribution $g_i$( ) of the i-th user for the first site. The Markov model Q( ) is used to assign the i-th user's purchase to the first site firm or a second site. Equation 2 below shows a mathematical illustration of the Markov model $Q_i$( ) for an i-th user.

$$Q_i(k, \phi_i, \lambda_i) = \begin{cases} \phi_i & k = 0 \\ (1 - \phi_i)(1 - \lambda_i)^{k-1}\lambda_i & k > 0 \end{cases} \quad \text{[Equation 2]}$$

In Equation 2, k is the number of unobserved purchases between two observed purchases. The IPT for the first site is the sum of k+1 random variables drawn from $f_i$( ), and given by $f_i(t; 2(k+1), \beta_i)$. The probability of k un-observed purchases between 2 observed ones is computed using Equation 2. The probability distribution $g_i$( ) of an i-th user's IPT at the focal firm is obtained by summing over all k (e.g., a large number for estimation) according to the below Equation 3.

$$g_i(t; \beta_i, \phi_i, \lambda_i) = \sum_{k=0}^{\infty} f_i(t; 2(k+1), \beta_i) \cdot Q_i(k, \phi_i, \lambda_i) \quad \text{[Equation 3]}$$

Using the expectation of the Gamma distribution (e.g., an Erlang distribution) with shape s and scale $\beta_i$, it can be shown that the expected value of $g_i$( ) (i.e., the expected time between observed purchases on the first site) is given by the below Equation 4.

$$\frac{s}{\beta_i} \cdot \frac{1 + \lambda_i - \phi_i}{\lambda_i} \quad \text{[Equation 4]}$$

Similarly, the expected time between unobserved purchases by the user at a second site is given by the below Equation 5.

$$\frac{s}{\beta_i} \cdot \frac{1 + \lambda_i - \phi_i}{1 - \phi_i} \quad \text{[Equation 5]}$$

The method of FIG. 4A further includes estimating parameters of the probability distribution $g_i$( ) for each user (e.g., an i-th user) by applying a Statistical modelling approach to features of each user (step 404). In an embodiment, the parameters are $\beta_i$, $\phi_i$, and $\lambda_i$.

In an embodiment, the Statistical modelling approach is a Hierarchical Bayes approach. The Hierarchical Bayes approach sets a prior distribution of ($\beta i$, $\phi_i$, and $\lambda_i$) to depend on other parameters, with their own prior distribution. The individual parameters ($\beta_i$, $\phi_i$, and $\lambda_i$) are expressed as functions of other parameters ($\eta$, $\gamma$, $\delta$) common across individuals that can be estimated from the features 330, on which data is available for each i-th user. The below Equation 6 is a re-parameterization technique to ensure that the parameters obey $\beta_i > 0$, $0 < \phi_i$, and $\lambda_i < 1$.

$$\beta_i = \exp(\theta_{\beta_1}) \quad \text{[Equation 6]}$$

$$\phi_i = \frac{\exp(\theta_{\phi_1})}{1 + \exp(\theta_{\phi_1})}$$

$$\lambda_i = \frac{\exp(\theta_{\lambda_1})}{1 + \exp(\theta_{\lambda_1})}$$

Then parameters ($\theta_{\beta i}$, $\theta_{\phi i}$, $\theta_{\lambda i}$) are specified as functions from the feature data 330. Features $X_{\beta i}$, $X_{\phi i}$, $X_{\lambda i}$, denote the three features of the feature data 330. A linear regression model is generated for each parameter according to the below Equation 6.

$$\begin{pmatrix} \theta_{\beta_1} \\ \theta_{\phi_1} \\ \theta_{\lambda_1} \end{pmatrix} = \begin{pmatrix} X_{\beta_i}^T \eta \\ X_{\phi_i}^T \gamma \\ X_{\lambda_i}^T \delta \end{pmatrix} + \begin{pmatrix} \varepsilon_{\beta_1} \\ \varepsilon_{\phi_1} \\ \varepsilon_{\lambda_1} \end{pmatrix} \quad \text{[Equation 7]}$$

$$\Theta_i = A_i B + \epsilon_i$$

Parameter $\Theta_i$ (e.g., set of all parameters to be learned for user i) is calculated for each observed inter-purchase-time t of a given user in the Dataset 320, where $A_i$ is a matrix of features $X_{\beta i}$, $X_{\phi i}$, $X_{\lambda i}$, and $\beta$ is determined from parameters $\eta$, $\gamma$, $\delta$ following equations 6 and 7. The parameters $\eta$, $\gamma$, $\delta$ may be estimated using a Markov Chain Monte Carlo (MCMC) method or a Stochastic Gradient Langevin Dynamics (SGLD) method. A value $\theta$ for each inter-purchase-time t of a given user in the Dataset 320 is multiplied in an overall likelihood function like that shown in below Equation 8 to determine a probability of a next purchase $L_i$.

$$\prod_{i=1}^{n} L_i \text{ such that } L_i = \prod_{j=1}^{m_i} g_i(t_{ij} | \Theta_i)$$ [Equation 8]

For example, with respect to the first entry of the Dataset 320 for the user with ID=1 having Observed inter-purchase-times of 12 days→3 days, a first value $\ominus$ is generated based on $t_{11}$ of 12 days to generate a first result, a second value $\ominus$ is generated based on $t_{12}$ of 3 days to generate a second result, and the first and second results are multiplied together to generate a probability of $L_1$ (e.g., corresponds to Pnp described above) that indicates the probability of next purchase by the given user.

Figure 5:
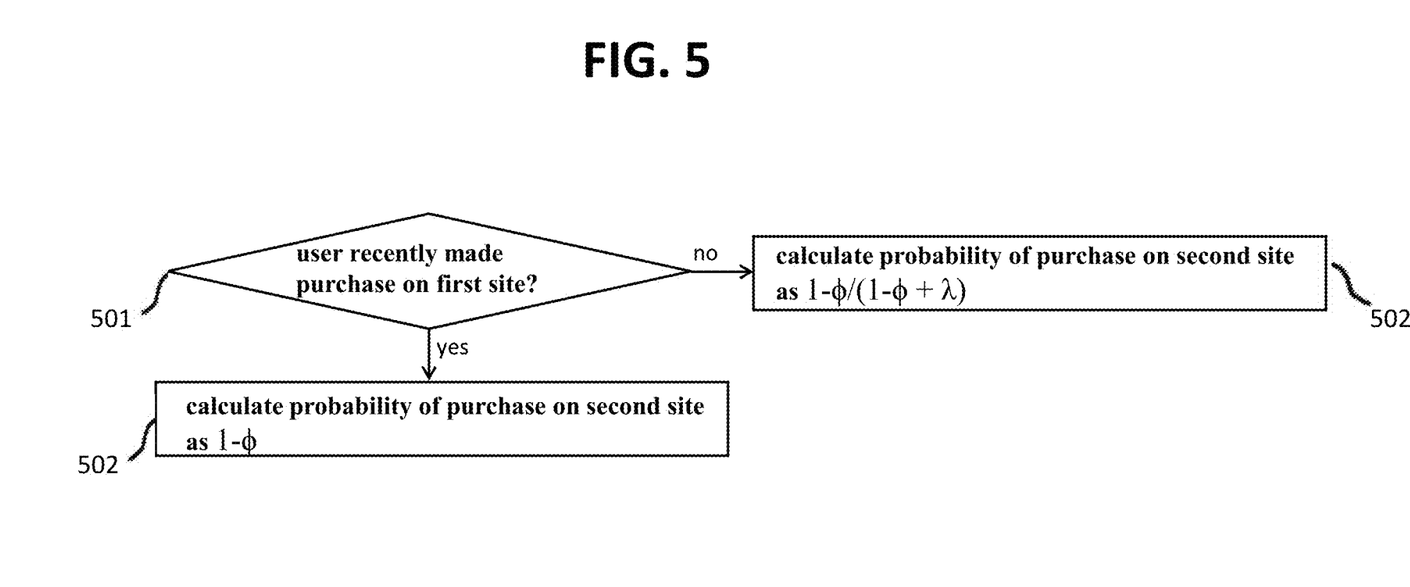
FIG. 5 illustrates a method of computing a probability that a next purchase of a user of a site will occur on another site according to an exemplary embodiment of the disclosure.

FIG. 5 illustrates a method of generating a probability of a next purchase being at a competitor Pcp according to an exemplary embodiment of the disclosure.

The method of FIG. 5 includes determining whether the user recently made a purchase at the focal firm (step 501). Determining whether a given user recently made a purchase on the first site may be performed by determining the current date, analyzing the user engagement data 136 for the given user to determine the most recent purchase made by the given user, determining the purchase date of the most recent purchase, and determining that a recent purchase occurred if the purchase date falls within the computed time period (e.g., see step 204 of FIG. 2).

The method of FIG. 5 further includes calculating a probability of a next purchase occurring on the second site Pcp as $1-\phi$ if a recent purchase was made on the first site (step 502). For example, if $\phi$ was previously calculated to be 0.2, then the probability of a next purchase occurring on a second site Pcp would be 0.8 or 80%.

The method of FIG. 5 further includes calculating a probability of a next purchase occurring on a second site Pcp as $1-\phi/(1-\phi+\lambda)$ if no recent purchase was made. For example, if $\phi$ was previously calculated to be 0.2 and $\lambda$ was previously calculated to be 0.3, then probability of a next purchase occurring on a second site Pcp would be (1−0.2)/(1−0.2+0.1)=0.8/0.9=0.88 or 88.8%. Thus, the probability of a next purchase occurring on the second site Pcp is based on $\phi$ when there has been a previous purchase and based on both $\phi$ and $\lambda$ when there has been no previous purchase.

The model described above can estimate an IPT of a given user, given lack of data on user purchases with the second sites. However, validating the model is a challenging task since the focal firm cannot access engagement data of its competitors. Thus, the present disclosure introduces a validation strategy that uses only the engagement data 136 of the first online site to simulate ground truth. The first site engagement data of purchases is randomly split into two portions. The first portion is not exposed to the model, thereby representing unobserved purchases. The second portion, representing observed portions is used for estimation. One can now validate the estimated IPT from the observed purchases, with the ground truth IPT, which comes from comparing purchases in the observed portion with that of the unobserved portion.

Some of the purchase-visits like those shown in FIG. 3A are randomly suppressed. The non-suppressed purchase-visits are treated as observed purchase visits to the first site (e.g., a purchase on a website for which information of users is present), and the suppressed purchase-visits are treated as unobserved purchase-visits to a second site (e.g., a purchase on a website for which information of users is not present). The model uses only the non-suppressed purchase-visits to estimate the IPT. Thus, the ground truth can be simulated from real data of the first site, to mimic a real-life condition where data on a second site is not available to the first site. The actual mean IPT across all sites (e.g., the first site and the second sites) is obtainable as the average of IPT across all purchase-visits in non-suppressed and suppressed data. The model ingests data of purchase-visits on the first site (non-suppressed purchase-visits), but does not use data from the second sites (suppressed purchase visits. Based on the non-suppressed purchase-visit data alone, one can estimate the IPT for all purchase visits of each user. The model can then be evaluated by comparing the estimated IPT with the actual IPT of the simulated ground truth.

Figure 6:
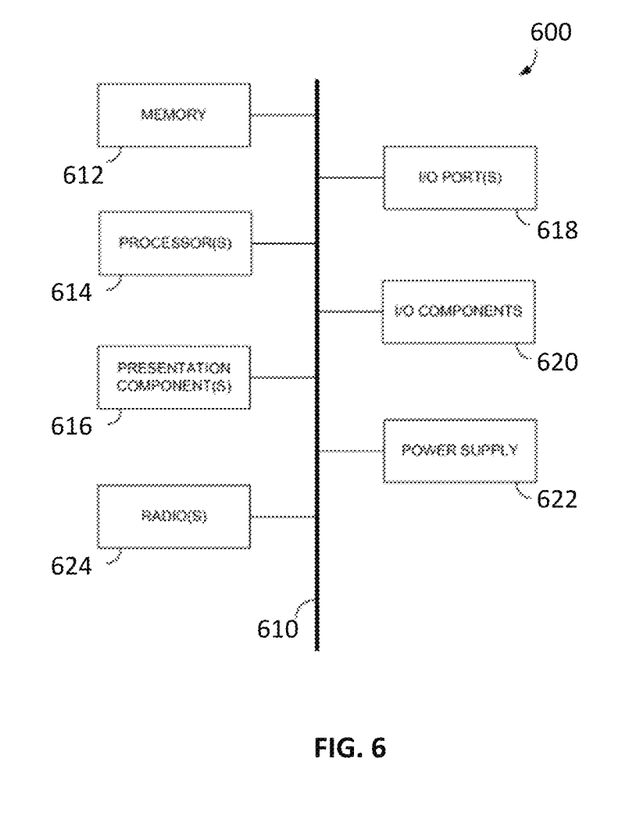
FIG. 6 illustrates an exemplary computing device used to perform one or more methods of the disclosure.

Having described implementations of the present disclosure, an exemplary operating environment in which embodiments of the present invention may be implemented is described below to provide a general context for various aspects of the present disclosure. Referring initially to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). For example, one may consider a presentation component such as a display device to be an I/O component. The diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Memory 612 includes computer-storage media in the form of volatile and/or nonvolatile memory. The memory may be removable, non-removable, or a combination thereof. Exemplary hardware devices include solid-state memory, hard drives, optical-disc drives, etc. For example, the user engagement data 136 and the model 138 may be stored in the memory 612 when the server 130 is implemented by computing device 600. The computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as, stereoscopic camera systems, infrared camera systems, RGB camera systems, and combinations of these for gesture detection and recognition.

The present invention has been described in relation to particular embodiments, which are intended in all respects to be illustrative rather than restrictive. Alternative embodiments will become apparent to those of ordinary skill in the art to which the present invention pertains without departing from its scope.

What is claimed is:

1. A method of predicting user purchase by users of a first online site at a second online site different from the first online site without using interactions of the users with the second online site, comprising:
    gathering engagement data from interactions of the users with only the first online site including purchases by the users at the first online site;
    generating an ordered sequence of inter-purchase-times (IPTs) for each of the users from the purchases by the users at the first online site, where each IPT of the ordered sequence is a time period between two of the purchases;
    generating a Stochastic model representing probabilities of purchase by the users at the first online site and a second other online site without using the interactions of the users with the second online site by assigning a first subset of the IPTs to the first online site and a second other subset of the IPTs to the second other online site;
    selecting a distribution representing a probability distribution of IPTs across the first online site and the second online site;
    combining the selected distribution with the Stochastic model to generate a probability distribution of IPTs for only the first online site;
    estimating parameters of the probability distribution of IPTs for the first online site by applying a Statistical modeling approach to features of each user;
    generating a probability of a next purchase by applying an ordered sequence of observed IPTs of a given one of the users determined from the first subset and assigned to the first online site and the parameters of the given user to the probability distribution of IPTs for only the first online site; and
    determining whether the next purchase occurs on the second online site based on the probability of the next purchase.

2. The method of claim 1, further comprising:
    computing a time period of the next purchase from an IPT of the selected distribution,
    wherein the determining whether the next purchase occurs at the second online site is performed when a current time is within the time period.

3. The method of claim 1, wherein the assigning is performed using behavior log data of the users interacting with only the first online site, wherein the behavior log data includes a plurality of entries, where each entry includes an identifier (ID) and a date.

4. The method of claim 3, further comprising generating the ordered sequence of IPTs by:
    determining a subset of the entries having the same ID;
    generating a time-ordered sequence of dates from the dates of the determined subset; and
    generating a time-ordered sequence of IPTs from the time-ordered sequence of dates.

5. The method of claim 3, wherein the date indicates one of a i) date of a purchase, ii) date a product was placed into a virtual shopping cart, or iii) a date a web page for the product was viewed for a threshold period of time.

6. The method of claim 1, wherein the features of the given user includes a loyalty status of the given user towards the first online site, a number of offers received by the given user, and a number of purchases made by the given user.

7. The method of claim 1, wherein the selected distribution is a Gamma distribution.

8. The method of claim 7, wherein the Gamma distribution is an Erlang distribution.

9. The method of claim 1, wherein the estimated parameters of the given user include a first probability that the given user with a previous purchase on the first online site makes a next purchase on the second online site and a second probability that the given user with a previous purchase on the second online site makes a next purchase on the first online site.

10. The method of claim 9, wherein the probability of the next purchase occurring at the second online site is 1−the first probability when the interactions of the given user with the first online site indicates the given user has made a recent purchase.

11. The method of claim 9, wherein the probability of the next purchase occurring at the second online site is (1−the first probability)/(1−the first probability+the second probability) when the interactions of the given user with the first online site indicates the given user has not made a recent purchase.

12. The method of claim 1, further comprising outputting an electronic message across a computer network to a computing device of the given user including a coupon for the first online site when the probability exceeds a threshold.

13. A system for predicting user purchase by users of a first online site at a second online site different from the first online site without using interactions of the users with the second online site, the system comprising:
    a memory storing a computer program; and
    a processor configured to execute the computer program, where the computer program is configured to:
        gather engagement data from interactions of the users with only the first online site including purchases by the users at the first online site;
        generate an ordered sequence of inter-purchase-times (IPTs) for each of the users from the purchases by the users at the first online site, where each IPT of the ordered sequence is a time period between two of the purchases;

generate a Stochastic model representing probabilities of purchase by the users at the first online site and a second other online site without using the interactions of the users with the second online site by assigning a first subset of the IPTs to the first online site and a second other subset of the IPTs to the second other online site;

select a distribution representing a probability distribution of IPTs across the first online site and the second online site;

combine the selected distribution with the Stochastic model to generate a probability distribution of IPTs for only the first online site;

estimate parameters of the probability distribution of IPTs for the first online site by applying a Statistical modeling approach to features of each user;

generate a probability of a next purchase by applying an ordered sequence of observed IPTs of a given one of the users determined from the first subset and assigned to the first online site and the parameters of the given user to the probability distribution of IPTs for only the first online site; and determine whether the next purchase occurs on the second online site based on the probability of the next purchase.

14. The system of claim 13, wherein the computer program computes a time period of the next purchase from an IPT of the selected distribution, and the determine of whether the next purchase occurs at the second online site is performed when a current time is within the time period.

15. The system of claim 13, wherein the assigning is performed using behavior log data of the users interacting with only the first online site and the behavior log data includes a plurality of entries, where each entry includes an identifier (ID) and a date.

16. The system of claim 13, wherein the selected distribution is an Erlang distribution.

17. The system of claim 13, wherein the estimated parameters of the given user include a first probability that the given user with a previous purchase on the first online site makes a next purchase on the second online site and a second probability that the given user with a previous purchase on the second online site makes a next purchase on the first online site.

18. The system of claim 17, wherein the probability of the next purchase occurring at the second online site is 1−the first probability when the interactions of the given user with the first online site indicates the given user has made a recent purchase.

19. The system of claim 17, wherein the probability of the next purchase occurring at the second online site is (1−the first probability)/(1−the first probability+the second probability) when the interactions of the given user with the first online site indicates the given user has not made a recent purchase.

* * * * *